United States Patent
Wang et al.

(10) Patent No.: US 10,886,818 B2
(45) Date of Patent: Jan. 5, 2021

(54) INPUT SHAFT STRUCTURE HAVING CONNECTED MOTOR AND SPEED REDUCER

(71) Applicant: Jing-Jin Electric Technologies Co., Ltd., Beijing (CN)

(72) Inventors: Yongwu Wang, Beijing (CN); Ping Yu, Beijing (CN); Jianwen Li, Beijing (CN); Tianjiao Liu, Beijing (CN); Xixian Yang, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 0 days.

(21) Appl. No.: 16/331,402

(22) PCT Filed: Jan. 20, 2017

(86) PCT No.: PCT/CN2017/071838
§ 371 (c)(1),
(2) Date: Mar. 7, 2019

(87) PCT Pub. No.: WO2018/045705
PCT Pub. Date: Mar. 15, 2018

(65) Prior Publication Data
US 2019/0252943 A1      Aug. 15, 2019

(30) Foreign Application Priority Data

Sep. 9, 2016   (CN) .................... 2016 2 1047987 U

(51) Int. Cl.
*H02K 7/116*      (2006.01)
*F16H 57/021*     (2012.01)
(Continued)

(52) U.S. Cl.
CPC ......... *H02K 7/116* (2013.01); *F16H 57/0025* (2013.01); *F16H 57/021* (2013.01);
(Continued)

(58) Field of Classification Search
CPC .......... H02K 7/116; H02K 7/003; H02K 7/08; H02K 7/083; F16H 57/0025; F16H 57/021; F16H 2057/02034; Y02T 10/64
(Continued)

(56) References Cited

U.S. PATENT DOCUMENTS 5,443,130 A        8/1995   Tanaka et al.
2011/0115343 A1    5/2011   Walser et al.
(Continued)

FOREIGN PATENT DOCUMENTS

CN      201051694 Y      4/2008
CN      100456604 C      1/2009
(Continued)

OTHER PUBLICATIONS

Fu B; Liang D, Electric Power Driving Device, Chongqing Dongba Machine Co Ltd, Sep. 30, 2015, CN 103072476 (English Machine Translation) (Year: 2015).*
(Continued)

*Primary Examiner* — Quyen P Leung
*Assistant Examiner* — Alexander A Singh
(74) *Attorney, Agent, or Firm* — Moser Taboada

(57) ABSTRACT

An input shaft structure for connecting a motor (4) and a gearbox (1) is provided, wherein the input shaft structure comprises a main shaft (5), an input end of the main shaft is located within the motor, and is connected to a rotor of the motor, an output end of the main shaft is located within the gearbox, and is connected to a driving gear (2) of the gearbox, and all of the two ends and an middle portion of the main shaft are provided with a bearing (6, 9, 14) to perform axial positioning, wherein a hub (2-1) of the driving gear extend toward two sides, and an inner bore of the hub matches with a shaft diameter of the main shaft to perform radial positioning, to ensure a concentricity of the driving
(Continued)

gear and the main shaft. The motor shaft and the input shaft of the gearbox are designed as an integral input shaft, which reduces the entire axial size of the power section, facilitates the layout of the entire vehicle, and has a smaller weight. The two ends of the driving gear are added radial positioning, to ensure a concentricity of the driving gear and the main shaft, which improves the stability of the system.

8 Claims, 3 Drawing Sheets

(51) Int. Cl.
    *H02K 7/08*     (2006.01)
    *H02K 7/00*     (2006.01)
    *F16H 57/00*     (2012.01)
    *F16H 57/02*     (2012.01)

(52) U.S. Cl.
    CPC ............ *H02K 7/003* (2013.01); *H02K 7/08* (2013.01); *F16H 2057/02034* (2013.01); *Y02T 10/64* (2013.01)

(58) Field of Classification Search
    USPC ................ 310/83, 99, 75 D, 156.08, 156.09
    See application file for complete search history.

(56) References Cited

U.S. PATENT DOCUMENTS

| | | |
|---|---|---|
| 2015/0349606 A1 | 12/2015 | Filzen et al. |
| 2016/0252171 A1 | 9/2016 | Hederstad et al. |

FOREIGN PATENT DOCUMENTS

| | | | |
|---|---|---|---|
| CN | 202782677 U | | 3/2013 |
| CN | 103072476 A | * | 5/2013 |
| CN | 203078306 U | | 7/2013 |
| CN | 104377881 A | * | 2/2015 |
| CN | 103072476 B | | 9/2015 |
| DE | 19841159 A1 | | 1/2000 |
| EP | 2819277 A1 | | 12/2014 |
| JP | S56099619 U | | 8/1981 |
| JP | H-01-96710 A | | 4/1989 |
| JP | H-04-102720 A | | 4/1992 |
| JP | 05022897 A | * | 1/1993 |
| JP | 2000-035092 A | | 2/2000 |
| JP | 2002-021943 A | | 1/2002 |
| JP | 2007-320322 A | | 12/2007 |
| JP | 2008-057630 A | | 3/2008 |
| JP | 2008-069793 A | | 3/2008 |
| JP | 2010-068562 A | | 3/2010 |
| JP | 2010-200408 A | | 9/2010 |
| JP | 2010-264587 A | | 11/2010 |
| JP | 2011-517638 A | | 6/2011 |
| JP | 2013-148108 A | | 8/2013 |
| JP | 2015-059579 A | | 3/2015 |
| JP | 2015086817 A | * | 5/2015 |
| WO | WO-2015144528 A1 | | 10/2015 |

OTHER PUBLICATIONS

Ueno H; Hossain M.A; Inoue T; Screw Compressor, Daikin Ind Ltd, Jul. 5, 2013, JP 2015086817 (English Machine Translation) (Year: 2013).*

Deng Y; Li F ; Liu M ; Qian Z ; Wang Y ; Xu D ; Zhang Y ; Zhao H, Integrated Type Energy Vehicle Driving Device, Feb. 25, 2015, CN 104377881 (English Machine Translation) (Year: 2015).*

Yoshida Osamu, AC Dynamo for Vehicle, Jan. 29, 1993, Hitachi Ltd, JP 05-055897 (English Machine Translation) (Year: 1993).*

European Supplementary Search Report for Application No. 17847881.4 dated Jun. 24, 2019.

International Search Report dated Mar. 29, 2017 for PCT Application No. PCT/CN2017/071838.

* cited by examiner

INPUT SHAFT STRUCTURE HAVING CONNECTED MOTOR AND SPEED REDUCER

TECHNICAL FIELD

The present disclosure relates to an input shaft structure for connecting a motor and a gearbox, for transmitting a torque between the motor and the gearbox.

BACKGROUND

In electric vehicles, the motor shaft and the input shaft of the gearbox are main shafts independent of each other, which transmit the torque via splined connection. Such a transmission structure is relatively complicated, and increases the axial sizes of the gearbox and the motor, which is adverse to the layout of the entire vehicle, and has a larger weight.

A gear and a main shaft in the prior art are generally connected by a flat key, and the gear and the main shaft are clearance fitted or transition fitted, which cannot ensure the concentricity, which affects the stability of the system.

SUMMARY

In view of the above problems, the present disclosure provides an input shaft structure for connecting a motor and a gearbox, in which the motor shaft and the input shaft of the gearbox are designed as an integral input shaft, which reduces the entire axial size of the power section, facilitates the layout of the entire vehicle, and has a smaller weight. A hub of the driving gear extends toward two sides, and an inner bore of the hub matches with a shaft diameter of the main shaft to perform radial positioning, to ensure a concentricity of the driving gear and the main shaft, which improves the stability of the system.

To achieve the above objects, the technical solutions of the present disclosure are realized as follows:

An input shaft structure for connecting a motor and a gearbox, wherein the input shaft structure comprises a main shaft, an input end of the main shaft is located within the motor, and is connected to a rotor of the motor, an output end of the main shaft is located within the gearbox, and is connected to a driving gear of the gearbox, and all of the two ends and an middle portion of the main shaft are provided with a bearing to perform axial positioning, a hub of the driving gear extends toward two sides, and an inner bore of the hub matches with a shaft diameter of the main shaft to perform radial positioning, to ensure a concentricity of the driving gear and the main shaft, an inner bore of a right end of the hub is transition fitted or interference fitted to the main shaft, a gap with a uniform size along the axial direction of the main shaft is provided between a left end of the hub and the main shaft, a bushing with a uniform thickness along the axial direction of the main shaft is provided in the gap, the bushing, the inner bore of the left end of the hub and the main shaft form a transition fit or an interference fit.

Optionally, the main shaft is provided with a snap ring that clips the bushing, or the main shaft is provided with a tighten nut that fastens the bushing.

Optionally, the bearing comprises a left-end bearing, a right-end bearing and a middle bearing.

Optionally, the left-end bearing is fixedly installed on the gearbox housing, and the right-end bearing is fixedly installed on the motor housing; and a middle housing is provided between the motor and the gearbox, and the middle bearing is fixedly installed on the middle housing.

Optionally, the middle housing is provided, on the left of the middle bearing, with a pressure washer that presses an outer end face of the middle bearing, and is provided with an oil seal on the right of the middle bearing.

Optionally, the main shaft is provided with an external spline on the left of the middle bearing, the driving gear is provided with an internal spline, and the internal spline of the driving gear is connected to the external spline of the main shaft.

Optionally, a right end of the hub of the driving gear presses an inner end face of the middle bearing, or a right end of the hub of the driving gear is provided with a shaft sleeve that presses an inner end face of the middle bearing.

Optionally, the main shaft is connected to the driving gear by a flat key, or the inner bore of the driving gear is an unthreaded hole, and is connected to the main shaft by interference fit or by welding.

The present disclosure, by using the above structure configuration, has the following advantages:

In the present disclosure, the motor shaft and the input shaft of the gearbox are designed as an integral input shaft, which has a simple structure, is convenient to install, reduces the entire axial size of the power section, facilitates the layout of the entire vehicle, and has a smaller weight.

In the present disclosure, a hub of the driving gear extends toward two sides, and an inner bore of the hub matches with a shaft diameter of the main shaft to perform radial positioning, to ensure a concentricity of the driving gear and the main shaft, which improves the stability of the system.

The above description is only an overview of the technical solutions of the present disclosure. In order to understand the technical means of the present disclosure more clearly, and to implement them according to the contents of the description, and in order to make the above and other objects, features and advantages of the present disclosure more fully understood, the particular embodiments of the present disclosure are provided below.

BRIEF DESCRIPTION OF DRAWINGS

By reading the detailed description of the preferable embodiments below, various other advantages and benefits will become clear to a person skilled in the art. The drawings are only for the purpose of illustrating the preferable embodiments, and are not considered as limitation to the present disclosure. Furthermore, throughout the drawings, the same reference signs denote the same elements. In the drawings.

Figure 1:
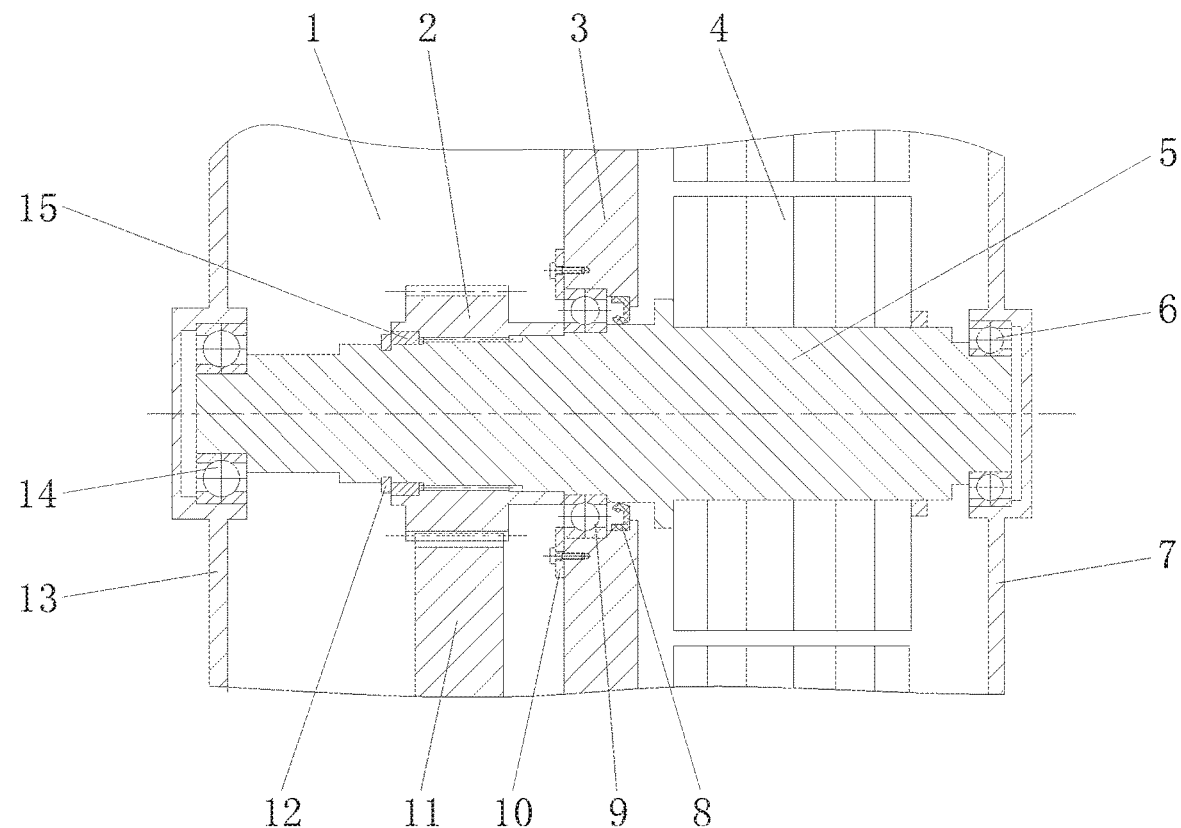
FIG. 1 is a sectional view of the present disclosure.

In the drawings: 1. gearbox; 2. driving gear; 2-1. hub; 2-2. internal spline; 3. middle housing; 4. motor; 5. main shaft; 5-1. external spline; 5-2. clipping slot; 6. right-end bearing; 7. housing; 8. oil seal; 9. middle bearing; 10. pressure washer; 11. driven gear; 12. snap ring; 13. housing; 14. left-end bearing; 15. Bushing; 16. tighten nut; and 17. shaft sleeve.

DETAILED DESCRIPTION

The exemplary embodiments of the present disclosure will be described in further detail below by referring to the drawings. Although the drawings illustrate the exemplary embodiments of the present disclosure, it should be understood that, the present disclosure can be implemented in various forms, which should not be limited by the embodiments illustrated herein. In contrast, the purpose of providing those embodiments is to more clearly understand the present disclosure, and to completely convey the scope of the present disclosure to a person skilled in the art.

The First Embodiment

Figure 2:
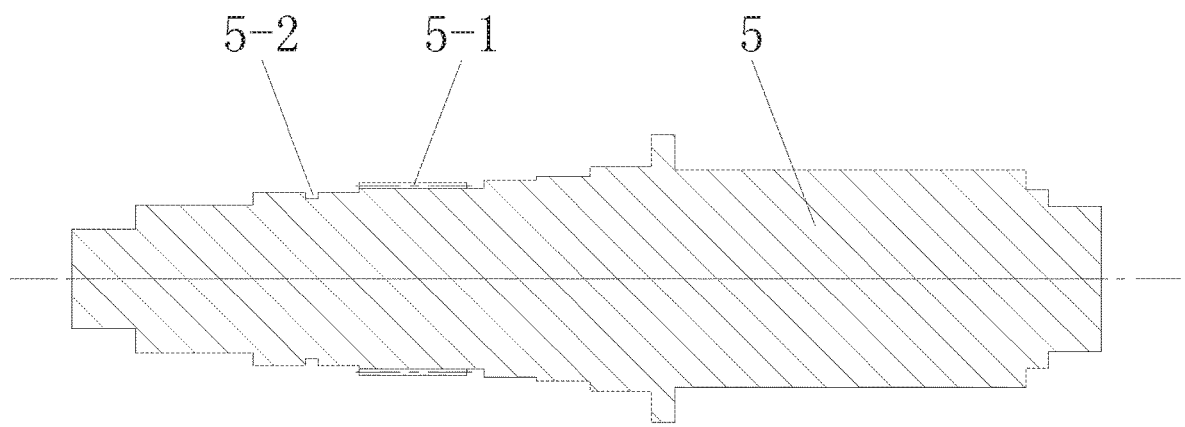
FIG. 2 is a sectional view of the main shaft employed in the present disclosure.
Figure 3:
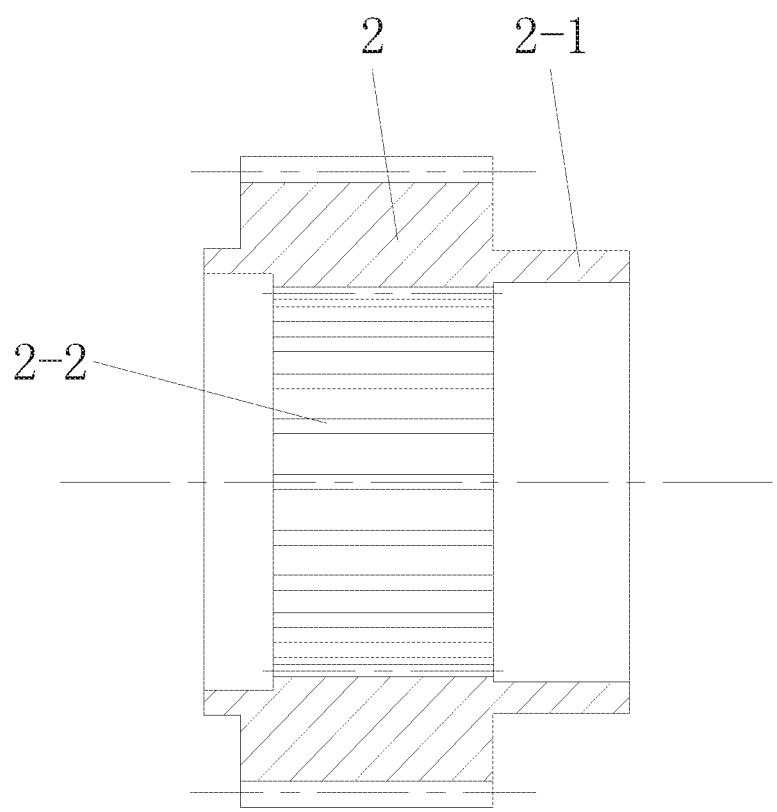
FIG. 3 is a sectional view of the driving gear employed in the present disclosure.

FIGS. 1, 2 and 3 show one of the embodiments of the present disclosure. In the present embodiment, an input shaft structure for connecting a motor and a gearbox is provided, wherein the input shaft structure comprises a main shaft 5, the input end of the main shaft 5 is located within the motor 4, and is connected to a rotor of the motor 4, the output end of the main shaft 5 is located within the gearbox 1, and is connected to a driving gear 2 of the gearbox 1, and all of the two ends and the middle portion of the main shaft 5 are provided with a bearing to perform axial positioning, wherein a hub 2-1 of the driving gear 2 extends toward two sides, and an inner bore of the hub matches with the shaft diameter of the main shaft 5 to perform radial positioning, to ensure the concentricity of the driving gear 2 and the main shaft 5.

The gearbox 1 is usually provided with multiple-stage gears therein, for example, a driven gear 11 that engages with the driving gear 2, and other gears are not shown in the drawings.

An inner bore of the right end of the hub 2-1 is transition fitted or interference fitted to the main shaft 5. A gap with a uniform size along the axial direction of the main shaft 5 is provided between a left end of the hub 2-1 and the main shaft 5. A bushing 15 with a uniform thickness along the axial direction of the main shaft 5 is provided in the gap. The bushing 15, the inner bore of the left end of the hub 2-1 and the main shaft 5 form a transition fit or an interference fit.

Figure 4:
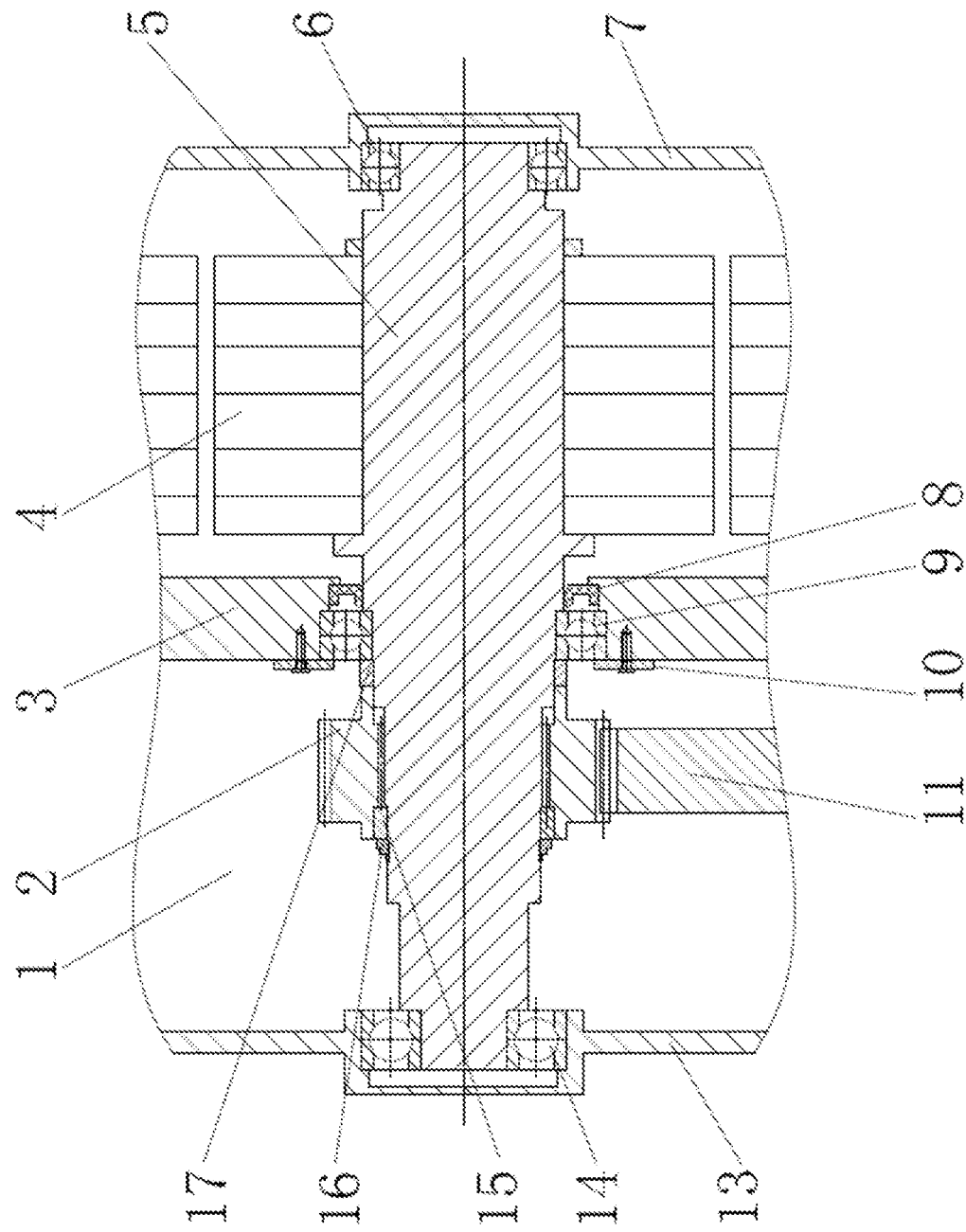
FIG. 4 is a sectional view of the present disclosure.

The main shaft 5 is provided with a snap ring 12 that clips the bushing 15, and correspondingly the main shaft 5 is required to be provided with a clipping slot 5-2. Alternatively, as shown in FIG. 4, the main shaft 5 is provided with a tighten nut 16 that fastens the bushing 15, and correspondingly the main shaft 5 is required to be provided with a thread.

As shown in FIG. 1, the positioning bearing comprises a left-end bearing 14, a right-end bearing 6 and a middle bearing 9.

The left-end bearing 14 is fixedly installed on the gearbox housing 1, and the right-end bearing 6 is fixedly installed on the motor housing 4; and a middle housing 3 is provided between the motor 4 and the gearbox 1, the middle bearing 9 is fixedly installed on the middle housing 3, and correspondingly the middle housing 3 is required to be provided with an installation slot.

As shown in FIG. 1, the middle housing 3 is provided, on the left of the middle bearing 9, with a pressure washer 10 that presses the outer end face of the middle bearing 9, and is provided with an oil seal 8 on the right of the middle bearing 9. The oil seal 8 can prevent the lubricating oil in the gearbox 1 from entering the motor 4.

Because the oil seal 8 is provided on the right of the middle bearing 9, the middle bearing 9 may be lubricated by the lubricating oil in the gearbox 1, compared with the mode using fat lubrication in the prior art, it improves the service life of the bearing.

As shown in FIGS. 1, 2 and 3, the main shaft 5 is provided with an external spline 5-1 on the left of the middle bearing 9, the driving gear 2 is provided with an internal spline 2-2, and the internal spline 2-2 of the driving gear 2 is connected to the external spline 5-1 of the main shaft 5.

The right end of the hub 2-1 of the driving gear 2 presses the inner end face of the middle bearing 9, or as shown in FIG. 4, the right end of the hub 2-1 of the driving gear 2 is provided with a shaft sleeve 17 that presses the inner end face of the middle bearing 9.

The Second Embodiment

As different from the first embodiment, in the present embodiment, the following mode may replace the splined connection: the main shaft 5 and the driving gear 2 are connected by a flat key, or the inner bore of the driving gear 2 is an unthreaded hole, and is connected to the main shaft 5 by interference fit or by welding.

The above descriptions are merely preferable embodiments of the present disclosure, and are not limiting the protection scope of the present disclosure. Any modifications, equivalent substitutions or improvements that are made within the spirit and principle of the present disclosure are all included in the protection scope of the present disclosure.

What is claimed is:

1. An input shaft structure for connecting a motor and a gearbox, wherein the input shaft structure comprises:
   a main shaft, an input end of the main shaft located within the motor, and connected to a rotor of the motor, an output end of the main shaft located within the gearbox, and connected to a driving gear of the gearbox, and all of the two ends and a middle portion of the main shaft provided with a bearing to perform axial positioning,
   wherein a hub of the driving gear extends toward two sides, and
   wherein an inner bore of the hub matches with a shaft diameter of the main shaft to perform radial positioning, to ensure a concentricity of the driving gear and the main shaft;
   an inner bore of a right end of the hub, the inner bore transition fitted or interference fitted to the main shaft;
   a gap with a uniform size along the axial direction of the main shaft, provided between a left end of the hub and the main shaft; and
   a bushing with a uniform thickness along the axial direction of the main shaft provided in the gap,
   wherein the bushing, the inner bore of the left end of the hub and the main shaft form a transition fit or an interference fit.

2. The input shaft structure according to claim 1, wherein the main shaft is provided with a snap ring that clips the bushing, or the main shaft is provided with a tighten nut that fastens the bushing.

3. The input shaft structure according to claim 1, wherein the bearing comprises a left-end bearing, a right-end bearing and a middle bearing.

4. The input shaft structure according to claim 3, wherein the left-end bearing is fixedly installed on the gearbox housing, and the right-end bearing is fixedly installed on the motor housing; and a middle housing is provided between the motor and the gearbox, and the middle bearing is fixedly installed on the middle housing.

5. The input shaft structure according to claim 4, wherein the middle housing is provided, on the left of the middle bearing, with a pressure washer that presses an outer end face of the middle bearing, and is provided with an oil seal on the right of the middle bearing.

6. The input shaft structure according to claim 3, wherein the main shaft is provided with an external spline on the left of the middle bearing, the driving gear is provided with an internal spline, and the internal spline of the driving gear is connected to the external spline of the main shaft.

7. The input shaft structure according to claim 3, wherein a right end of the hub of the driving gear presses an inner end face of the middle bearing, or a right end of the hub of the driving gear is provided with a shaft sleeve that presses an inner end face of the middle bearing.

8. The input shaft structure according to claim 1, wherein the main shaft is connected to the driving gear by a flat key, or the inner bore of the driving gear is an unthreaded hole, and is connected to the main shaft by interference fit or by welding.

* * * * *